(12) United States Patent
Trakic et al.

(10) Patent No.: US 8,590,044 B2
(45) Date of Patent: Nov. 19, 2013

(54) SELECTIVE VIRUS SCANNING SYSTEM AND METHOD

(75) Inventors: Adnan Trakic, North Potomac, MD (US); Amit K. Jangal, Karnataka (IN); Pathak Pankaj, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1828 days.

(21) Appl. No.: 11/106,317

(22) Filed: Apr. 14, 2005

(65) Prior Publication Data

US 2006/0236398 A1 Oct. 19, 2006

(51) Int. Cl.
*G06F 12/14* (2006.01)

(52) U.S. Cl.
USPC ............... 726/24; 726/22; 726/23; 726/25; 713/188

(58) Field of Classification Search
USPC .......... 713/1, 2, 188, 194; 380/200, 201, 255, 380/277; 726/2, 22–25
See application file for complete search history.

(56) References Cited

U.S. PATENT DOCUMENTS

| | | | |
|---|---|---|---|
| 5,473,769 A | | 12/1995 | Cozza |
| 5,574,898 A * | | 11/1996 | Leblang et al. ............... 707/1 |
| 5,649,095 A | | 7/1997 | Cozza |
| 5,822,517 A | | 10/1998 | Dotan |
| 6,021,510 A | | 2/2000 | Nachenberg |
| 6,535,891 B1 * | | 3/2003 | Fisher et al. ................ 707/203 |
| 6,728,397 B2 * | | 4/2004 | McNeal ........................ 382/137 |
| 6,732,124 B1 * | | 5/2004 | Koseki et al. ................. 707/202 |
| 6,735,700 B1 | | 5/2004 | Flint et al. |
| 6,981,252 B1 * | | 12/2005 | Sadowsky ..................... 717/176 |
| 7,216,366 B1 * | | 5/2007 | Raz et al. ........................ 726/24 |
| 7,266,843 B2 * | | 9/2007 | Tarbotton et al. ............... 726/22 |
| 7,299,495 B2 * | | 11/2007 | King et al. ...................... 726/22 |
| 2001/0016841 A1 * | | 8/2001 | Karasudani ....................... 707/1 |
| 2002/0174349 A1 | | 11/2002 | Wolff et al. |
| 2004/0068523 A1 * | | 4/2004 | Keith et al. ................... 707/200 |
| 2005/0273858 A1 * | | 12/2005 | Zadok et al. .................... 726/24 |
| 2006/0174344 A1 * | | 8/2006 | Costea et al. ................... 726/24 |

OTHER PUBLICATIONS

Slade, M.D., "Automated Virus Protection Software Without Noticeable System Overhead," TDB, vol. 36, No. 10, Oct. 1993, pp. 383-384.

* cited by examiner

*Primary Examiner* — Saleh Najjar
*Assistant Examiner* — Joseph Pan
(74) *Attorney, Agent, or Firm* — Douglas A. Lashmit; Hoffman Warnick LLC

(57) ABSTRACT

A virus scanning system and method. A system is provide that includes: a full scanning system for performing a full scan of each file in a file system; a file inventory system for inventorying each file in the file system and generating a set of inventory records, wherein each inventory record includes a unique key associated with each file in the file system; an inventory compare system for comparing a current set of inventory records with an existing set of inventory records to identify files in the file system that were modified since the existing set of inventory records was generated; and a selective scanning system for selectively scanning only files in the file system that were identified as modified by the inventory compare system.

14 Claims, 3 Drawing Sheets

SELECTIVE VIRUS SCANNING SYSTEM AND METHOD

BACKGROUND OF THE INVENTION

1. Technical Field

The present invention relates generally to virus scanning, and more specifically relates to a system and method for reducing the computational resources required for performing virus scans.

2. Related Art

Computer virus infections continue to be one of the more frustrating problems that organizations must deal with. The downtime that an organization faces after a virus attack can severely impact employee productivity and business. In order to address this issue, most organizations run automated periodic (e.g., weekly) virus scans on all the machines in their organization, with the goal of detecting viruses in early stages and eliminating them.

Every time a scheduled virus scan runs, it checks all the files on the computer. In most present day applications, scanners even check the files inside a compressed archive. This causes intensive file operations, which in turn consumes significant CPU cycles. While running, the scan can significant slow down the host machine, seriously impacting the performance and hence the productivity of the workstation and the employee.

A typical hard disk containing around 25 gigabytes (GB) of data takes about five to six hours to scan. If the scan occurs when an employee needs access to the machine, the employee may often terminate the weekly scan in order to free up machine resources and carry out their normal work. This defeats the purpose of the periodic scheduled virus scan.

As new viruses are found, their signatures are updated in the virus definition files. This virus definitions database grows with time. Each new virus strain adds on a fraction of a second to the time required to scan each file. Additionally, users also create or add several new files every week. Thus, the overall scan time of a computer is ever increasing.

The amount of productive time that an organization loses with virus scanning is also alarming. When a virus scan is running, it can consume more than 70% of the CPU cycles. Thus, a task that would take 10 minutes to execute on a standalone machine takes 13 minutes when the virus scan is running. So, for every 1000 employees, an organization looses 2000 productive hours for a normal scan of six hours.

As is evident, present virus scanning techniques are inefficient. For instance, when a user returns from a vacation and boots his or her machine, the virus scanner may start automatically, even though nothing has changed on that machine since the virus scanner last run. Problems with the current virus scanning approach include:

1. The scan checks each file on the machine and consumes the vital resources of the machine. This seriously affects the productivity of the machine;
2. Users are often tempted to terminate the scan, thereby increasing the potential of hosting a virus on their machines; and
3. Virus scan duration increases over time, along with the amount of productive time wasted by an organization.

Accordingly, a need exists for a virus scanning system and method that can more efficiently scan computers for viruses.

SUMMARY OF THE INVENTION

The present invention addresses the above-mentioned problems, as well as others, by providing a virus scan system that can be configured to only scan files identified as being modified since the last scan in order to reduce computational overhead.

In a first aspect, the invention provides a virus scan system, comprising: a full scanning system for performing a full scan of each file in a file system; a file inventory system for inventorying each file in the file system and generating a set of inventory records, wherein each inventory record includes a unique key associated with each file in the file system; an inventory compare system for comparing a current set of inventory records with an existing set of inventory records to identify files in the file system that were modified since the existing set of inventory records was generated; and a selective scanning system for selectively scanning only files in the file system that were identified as modified by the inventory compare system.

In a second aspect, the invention provides a program product stored on a computer readable medium for performing a virus scan on a file system, the program product comprising: program code configured for performing a full scan of each file in the file system; program code configured for inventorying each file in the file system and generating a set of inventory records, wherein each inventory record includes a unique key associated with each file in the file system; program code configured for comparing a current set of inventory records with an existing set of inventory records to identify files in the file system that were modified since the existing set of inventory records was generated; and program code configured for selectively scanning only files in the file system that were identified as modified.

In a third aspect, the invention provides a method of performing a virus scan on a file system, comprising: inventorying each file in the file system and generating a current set of inventory records, wherein each inventory record includes a unique key associated with each file in the file system; if an existing set of inventory records is located, comparing the current set of inventory records with the existing set of inventory records to identify files in the file system that were modified since the existing set of inventory records was generated, and selectively scanning only files in the file system that were identified as modified; and if the existing set of inventory records is not located, performing a full scan of each file in the file system.

In a fourth aspect, the invention provides a method for deploying an application that scans a file system for viruses, comprising: providing a computer infrastructure being operable to: perform a full scan of each file in a file system; inventory each file in the file system and generating a set of inventory records, wherein each inventory record includes a unique key associated with each file in the file system; compare a current set of inventory records with an existing set of inventory records to identify files in the file system that were modified since the existing set of inventory records were generated; and selectively scan only files in the file system that were identified as modified by the inventory compare system.

In a fifth aspect, the invention provides computer software embodied in a propagated signal for scanning a file system for viruses, the computer software comprising instructions to cause a computer to perform the following functions: inventory each file in the file system and generate a current set of inventory records, wherein each inventory record includes a unique key associated with each file in the file system; if an existing set of inventory records is located, compare the current set of inventory records with the existing set of inventory records to identify files in the file system that were modified since the existing set of inventory records were generated, and selectively scan only files in the file system that were identified as modified; and if the existing set of inventory records is not located, perform a full scan of each file in the file system.

In a further aspect, portions of the invention may be implemented over a network, such that: a network server could force a full scan of one or more client computers, a network server could store inventory records for one or more client computers, and/or a network server could collect virus data from one or more client computers.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
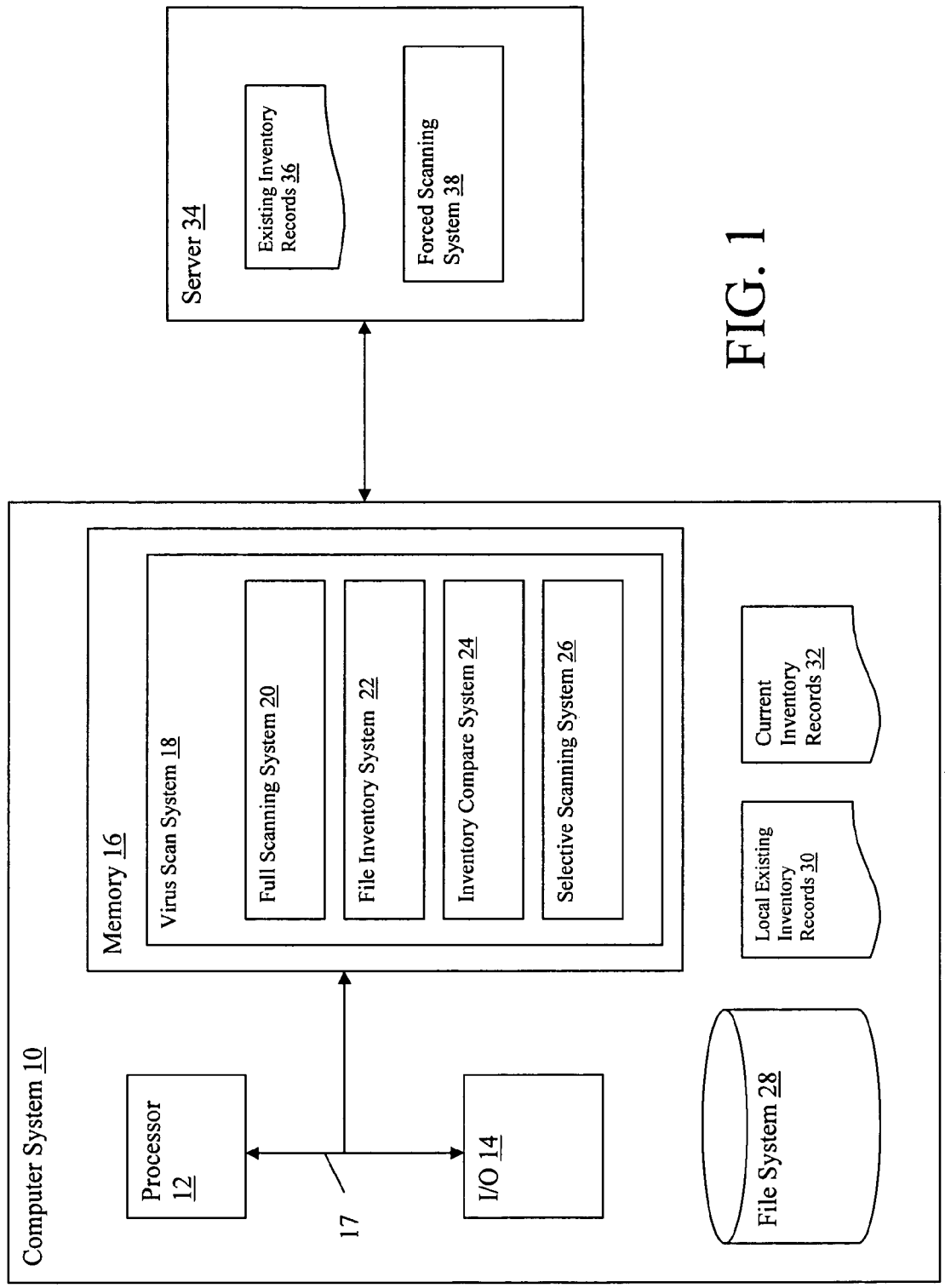
FIG. 1 depicts a computer system having a virus scan system in accordance with the present invention.

Referring now to the drawings, FIG. 1 depicts a computer system 10 having a virus scan system 18 for detecting viruses in file system 28. Virus scan system 18 includes a full scanning system 20 for scanning all of the files in file system 28; a file inventory system 22 for inventorying file information from the files in file system 28; an inventory compare system 24 for comparing current inventory records 32 with local existing inventory records 30 (or a similar set of records 36 saved to a network) to identify modified files; and a selective scanning system 26 for scanning just the identified modified files. Each of these systems may be implemented as a software program product, and are described in further detail below.

In general, computer system 10 may comprise, e.g., a desktop, a laptop, a workstation, etc. Moreover, computer system 10 could be implemented as part of a client and/or a server. Computer system 10 generally includes a processor 12, input/output (I/O) 14, memory 16, bus 17, and a file system 28. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

File system 28 generally represents files that are accessible to computer system 10. The files may be stored in a local memory, e.g., on a hard drive, on a disk, on a removable storage device, etc., or be distributed amongst a set of storage devices, locally and/or remotely.

In the embodiment described in FIG. 1, computer system 10 is networked to a server 34. Communications between computer system 10 and server 34 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

Most viruses are incorporated into a file by appending the virus code to the end of a file. The virus also changes the beginning of file in such a manner that the virus code is executed first. For an executable file, this is achieved by changing the first few bytes to cause a jump instruction code to an appended code section containing the actual virus. Since a virus adds code to the existing file, it also changes the size and/or timestamp of the infected file. The present invention utilizes these facts to allow selective scanning of only those files in file system 28 that have been modified.

In accordance with the virus scan system 18 of the present invention, when the virus scan system 18 is run on a machine for the first time, full scanning system 20 scans each of the files in file system 28. File inventory system 22 is also utilized to establish a baseline set of inventory records, e.g., local existing inventory records 30, of all the files. These records 30 include a unique key for each file, which comprises the complete name of the file e.g., c:\windows\system32\abc.exe, its size and the timestamp of the last alteration. Accordingly, the key reliably depicts when a file was last modified, i.e., altered, moved, etc. After creating the local existing inventory records 30, virus scan system 18 may also post a copy of the existing inventory records 36 to a centrally configured server 34. Although this step is optional, it provides additional functionality and redundancies to the virus scan system 18, as described below.

Whenever virus scan system 18 runs, it checks if the local existing inventory records 30 exist. If they do not, then it is presumed that this is the first run of the virus scan system 18 and a full scan needs to be performed. If the local existing inventory records 30 are found, then the virus scan system 18 can also check for the existing inventory records 36 for computer system 10 on the network server 34. If the records 36 are found, then virus scan system 18 checks if the administrator wishes to perform a full scan of file system 28 utilizing forced scanning system 38. If no, then file inventory system 22 takes a current inventory of all the files on the file system 28 and generates a set of current inventory records 32. Then, inventory compare system 24 compares the keys in the local existing inventory records 30 with the current inventory records 32 to generate a list of all the files that have been modified, i.e., changed, moved, newly created or altered in anyway.

After composing a list of modified files, the current inventory records 32 are uploaded to the server 34 to update the existing inventory records 36 with this latest inventory. The virus scan system 18 will then implement selective scanning system 26 to only scan the files that have been identified as modified. Based on experimental data for a typical personal computer, less than three percent of the files in the file system are modified during the course of one week of activity on the machine.

As noted above, a network administrator on server 34 can implement forced scanning system 38 to force a full scan. In this case, then virus scan system 18 will disregard the local existing inventory records and start from scratch using full scanning system 20. An illustrative process for implementing forced scanning system is described below.

Based on experimental data, it has been shown that selective scanning reduces the virus scan time of a computer by about 3428%. Moreover, machines with less activity will be scanned faster, and scans can be easily scheduled, e.g., during lunch, to not interfere with the employee's work activities. This eliminates user frustration and reduces motivation for canceling a scan run. The invention also provides the flexibility to the network administrator to force a full scan for a particular user or for all the users of a particular group, e.g., geography, if deemed necessary.

As noted above, file inventory system 22 creates an inventory of the files in file system 28. The inventory of local existing inventory records 30 may be stored as a data file on the computer system 10. When the virus scan system 18 runs, it checks to see if the file exists. If it does, then it means that virus scan system 18 has run on computer system 10 before. If such a file does not exist, then it is the first run for virus scan system 18. For a first run, all the files on the file system 28 need to be scanned using full scanning system 18. Before doing the scan, file inventory system 22 will first inventory the file system 28. The inventory consists of records for each file in the file system 28. An illustrative record is as follows:

754657325*C:\WINDOWS\system32\wmv8dmod.dll*10306224000003?11327

The record consists of three keys separated by asterisks. The (754657325) is the unique key for a file, which comprises a hash code of the file's fully qualified name. The filename could be used for this key, but since the numeral comparison is faster than string comparison, higher performance is achieved. This key depends on the fully qualified filename. So, for the file C:\WINDOWS\system32\wmv8dmod.dll, it will always come out to be 754657325. Since operating systems do not allow two files with identical names in one directory, there cannot be two C:\WINDOWS\system32\wmv8dmod.dll files on the hard disk. There could be a wmv8dmod.dll in another directory, but that will generate a different key.

The next part of the record, C:\WINDOWS\system32\wmv8dmod.dll, is the fully qualified file name. The third part is the signature of the file 10306224000003?11327, which is used for comparison. This signature is composed of two values. The first part is the time of last modification of the file and the second part is the size of the file in bytes. Both these values are separated by a '?'. If a file is manipulated or updated, then this key will change. Even if a virus manipulates the timestamp of the file to make it appear as if it has not been changed, the size of the altered file would still change, making this signature different.

If the file containing the local existing inventory records 30 is detected on the system, then it means that the full scanning system 20 has previously been run. In this case, virus scan system 18 reads the information from this file and then proceeds to take a fresh inventory of the system. This new inventory is stored in a second file and contains the current inventory records 32. After generating the current inventory records 32, inventory compare system 24 looks for files that: (1) exist in current inventory records but do not exist in local existing inventory records. These are the files that have been created after the virus scan system 18 last ran and thus need to be scanned; and (2) exist in both sets of records 30, 32, but their signatures do not match. These are the files that have been modified since the last run and also need to be scanned.

Any files that exist in the local existing inventory records 30 but do not exist in the current inventory records 32 are not considered, because these are the files that have been deleted since the virus scan system 18 last ran, and thus do not need to be scanned. After identifying those files that need to be scanned, virus scan system 18 can delete the old inventory file, i.e., local existing inventory records 30, and replace it with the file containing the current inventory records 32. This ensures that the latest inventory will be utilized during the next scan.

In an alternative embodiment, virus scan system 18 can utilize the existing inventory records 36 loaded on server 34. The difference in that approach would be that instead of looking locally for the existing inventory records file, the virus scan system 18 will look on the network server 34 for the for the file of existing inventory records 36. Because the server 34 may store records for any number of networked computer systems, a table may be utilized in which each computer is assigned a unique ID, as follows:

TABLE 1

| Unique ID | Geography ID | Last Scanned | Virus Found | Force Scan | Force Scan Until |
|---|---|---|---|---|---|
| 233612A-993CP9X | US-NA-MD-GBURG | 2004-09-12-16:49:53:45464 | 0 | N | — |

This table contains a unique id for the machine, the geographical location of the machine, the date when the scanner last ran (2004-09-12) and the time and size of the inventory file (16:49:53:45464). The unique id is derived based on machine's type/model and serial number. Also included in the table is the number of viruses found, whether a "force scan" option is set, and how long the force scan is set.

The following are a number of scenarios that could result when a scan is initiated:

Scenario I: No Inventory Records on the Server and No Local Inventory Records:

This can happen when the virus scan system 18 is run for the first time. In such a case, the scanner will prepare the inventory of the machine, proceed to scan all the files and update the information on the server.

Scenario II: No Inventory Records on the Server, Local Inventory Records Exists:

If the scanner cannot find any records for the computer system 10 on the server 34, then it looks for file locally. If that file is found, then it means that the scanner has already run on this machine, but it could not update the file on the server 34 because of a lack of a network connection, etc. For this case, the local file is used as the starting point for the scan. After the scan completes, the scanner updates the inventory information on the server 34.

Scenario III: Inventory Records Exist on the Server, and Local Inventory Records Exist:

This is the normal scan scenario, where the virus scan system 18 previously ran and updated the inventory records on the server 34 and ran a selective scan. This time around, the virus scan system 18 will again run the selective scan and update the details on the server 34.

Scenario IV: Inventory Records Exist on the Server, Local Inventory Records Do Not Exist:

This could happen if the local inventory file somehow got deleted. In such cases, the virus scan system 18 will proceed with the full scan of the system and then update the inventory records on the server 34.

Scenario V: Server Cannot Be Reached, Local Inventory Records Exist:

This scenario would result when the computer system 10 is not connected to the network 34. In this case, the virus scan system 18 will use the local inventory records as the starting point and perform a selective scan.

The main advantage of this networked approach is that it gives the administrator the authority to force the full scan of the system—for a particular machine, or for a particular set of machines, e.g., those sharing a common geography. The administrator also has data detailing how many viruses were found on the machine when the virus scan system 18 was run. If the administrator finds a significant number of infected machines for one particular region or location, then he or she could force a full scan of all the machines for that location. To execute the force scan, the administrator should set the Force Scan field of the above table to a Y (yes).

In this case, the virus scan system 18 will disregard the inventory records on the computer system 10 and will perform a full scan. After the scan is complete, then the virus scan system 18 will update the server 34 with the latest inventory records and reset the force scan field back to an 'N'. The administrator could also force the full scan every time until a particular date/time by entering a date/time value in the last field of the table.

The networked approach therefore has the advantages of providing the administrator with the capability of preventing a virus attach before it becomes a major threat. If virus attacks are reported in a particular location, then the administrator can force the scan of each machine in that location. In addition, the administrator can force scans for a date range. This helps when a new virus strain has been detected and the organization needs to be on guard to protect its network.

Regardless of whether the network or local approach is used, after scanning all the files and depending on whether a virus was found in a file or not, the virus scan system 18 will update the local existing inventory records 30. For the uninfected files or the files that were cleaned, the inventory records 30 will be updated to append the new key for each file. For the files that were found to be infected and could not be cleaned, no new record will be added in the inventory. This will ensure that these infected files are scanned every time the virus scan system 18 runs until they can be cleaned.

It is noted that as a part of keeping updated with the newly found viruses, a virus definition file must be updated regularly. Whenever a new virus definition file is made available, the local existing inventory records 30 will be deleted. This will make sure that all the files are scanned again for the newly discovered viruses.

It may so happen that a virus scan is aborted along the way because of some reason. The present invention will take this contingency into account. As described above, at the end of the inventory process, the list of the files to be scanned are fed to the virus scan system 18. After the scan completes, the scanner will update the inventory with the new file information. No harm is done if the scan is aborted before the inventory is composed. The system will start from the scratch in such a case. Nor is it a problem if the scan is aborted after the file system 28 has been inventoried, but before the virus scan system 18 could update the inventory. For this scenario, the modified files will still be flagged in the next run, because the inventory is updated only after the scanner's feedback results are received. Thus, the virus scan system 18 is resilient to interruptions.

Figure 2:
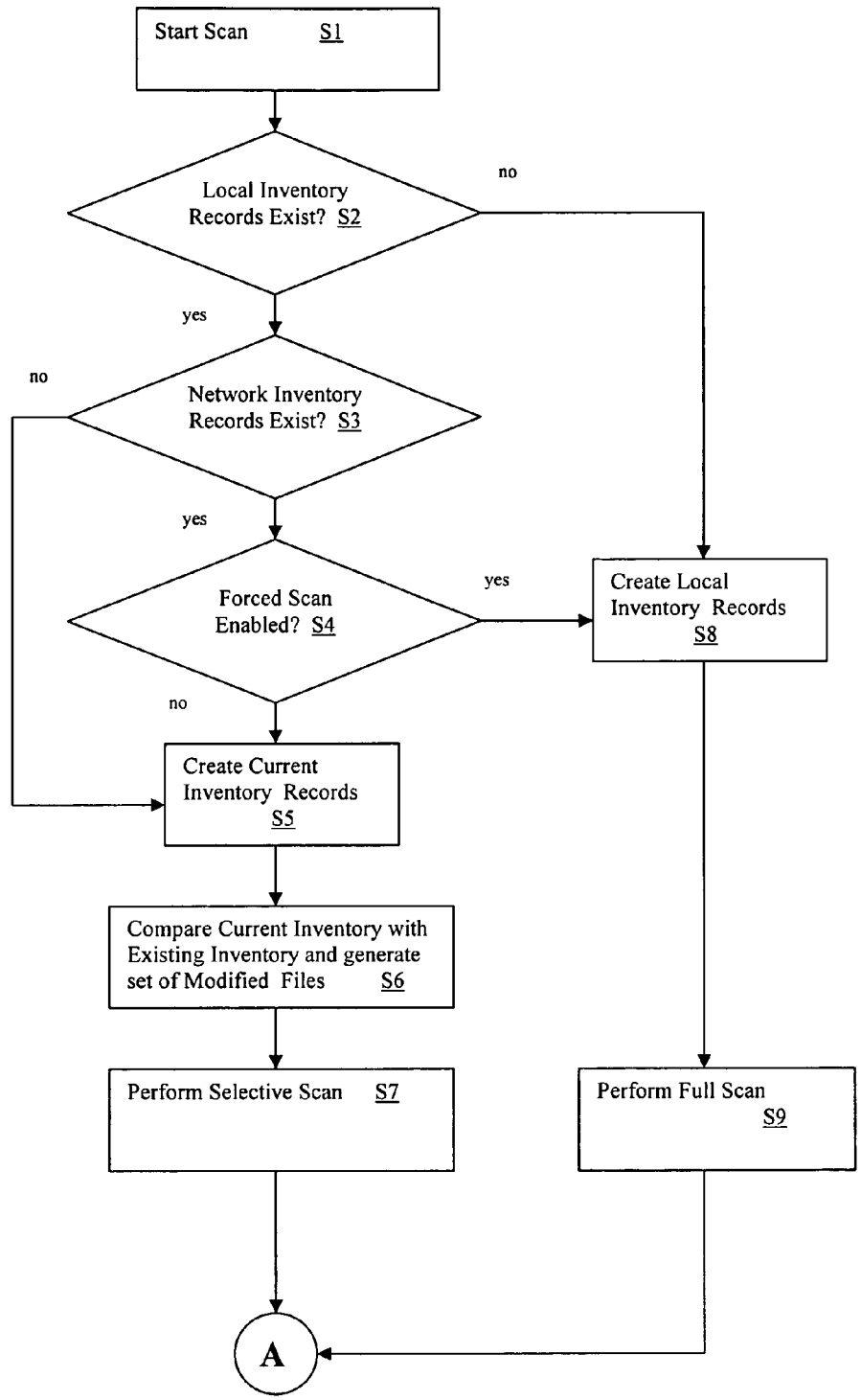
FIGS. 2 and 3 depict a flow chart showing a method of implementing the virus scanning system of FIG. 1.
Figure 3:
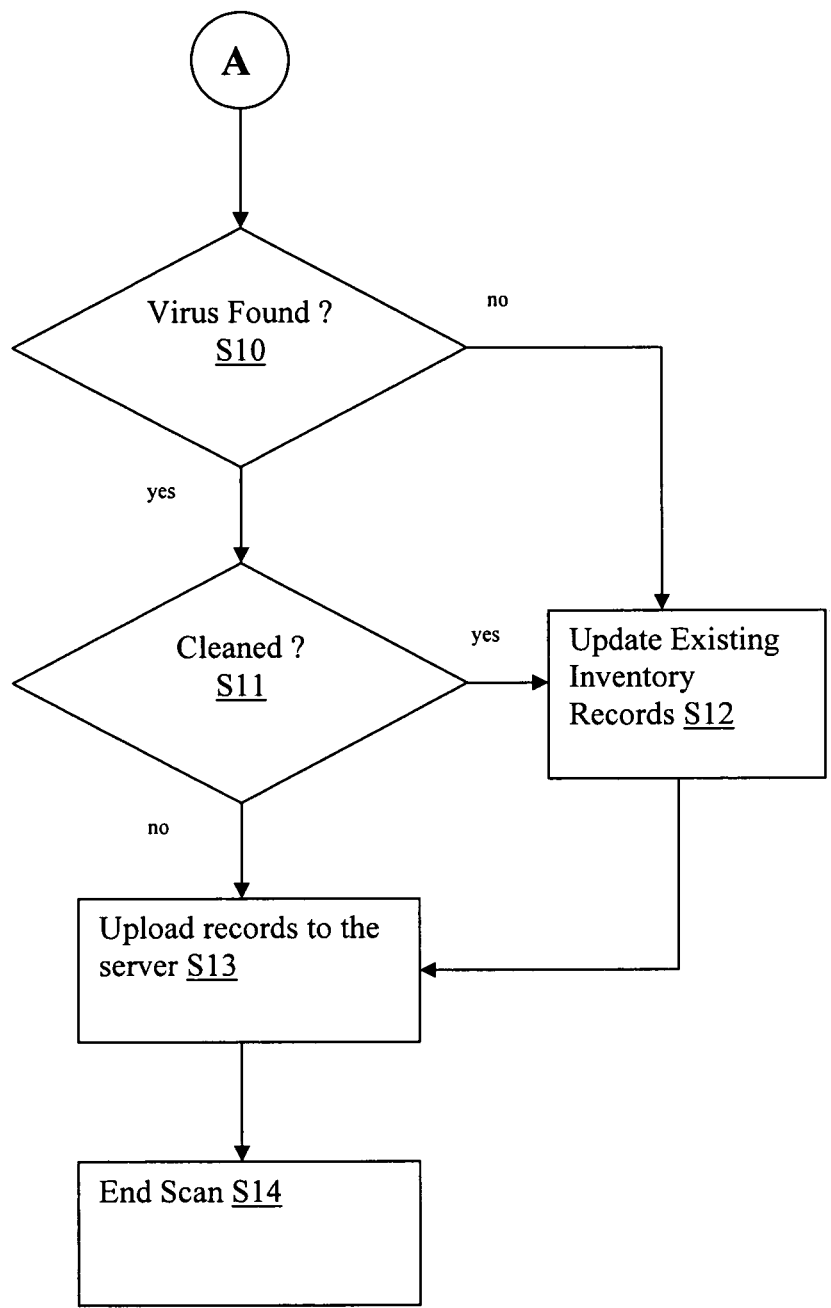

FIGS. 2 and 3 provide a flow diagram of a method of implementing the present invention. At the first step S1, the scan is started. At the next step S2, a check is made to see if a local inventory records exists. If they exist, then a check is made to see if network inventory records exist at step S3. If they exist, then a check is made to see if a forced scan is enabled at step S4. If the force scan is enabled or no local inventory records exist at step S2, then a new set of local inventory records are created at step S8, and a full scan is performed at step S9.

If force scan is not enabled, then at step S6, the existing inventory records are compared to the current inventory records to identify a set of files that have been modified since the existing inventory records were generated. Then, at step S7, a selective scan is performed on these files identified as being modified.

Next, as shown in step S10 of FIG. 3, a check is made to see if any viruses were found. If a virus was found, then a check is made to see if the file was cleaned at step S11. If the file was cleaned or no virus was found, then the existing inventory records are locally updated at step S12 and uploaded to the server at step S13. If the file was not cleaned, then the records are also uploaded to the server at step S13. Finally, the scan ends at step S14.

It should be appreciated that the teachings of the present invention could be offered as a business method on a subscription or fee basis. For example, a computer system 10 comprising a virus scan system 18 could be created, maintained and/or deployed by a service provider that offers the functions described herein for customers. That is, a service provider could offer to perform selective scanning as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A virus scan system, comprising:
a full scanning system for performing a full scan of each file in a local file system;
a file inventory system for inventorying each file in the local file system and generating a set of current inventory records, wherein each current inventory record includes a unique key of the associated file, a complete filename of the associated file, and a signature of the associated file; wherein the unique key includes a hash code of the complete filename of the associated file, and the signature includes a timestamp of a last modification of the associated file and a size of the associated file;
a system for interfacing with a server to store and retrieve an existing set of inventory records stored on the server;
an inventory compare system for comparing the current set of inventory records with the existing set of inventory records to identify files in the local file system that were modified since the existing set of inventory records was generated, wherein a file is identified as modified if the signature for the file in the current set of inventory records does not match the signature for the file in the existing set of inventory records such that at least a size of the file in the current set of inventory records is different from a size of the file in the existing set of inventory records; and
a selective scanning system for selectively scanning only files in the local file system that were identified as modified by the inventory compare system;
wherein, in the case that a record of the current set of inventory records is included at the local file system and not included in the existing set of inventory records on the server, the selective scanning system selectively scans the file associated with the record not included in the existing set of inventory records and located at the local file system, and the system for interfacing with the server submits a request to the server to update the existing set of inventory records stored on the server to indicate that the selective scanning of the file associated with the record not included in the existing set of inventory records and located at the local file system has occurred.

2. The virus scan system of claim 1, further comprising a system for forcing a full scan.

3. The virus scan system of claim 1, wherein the full scan system is implemented if the existing set of inventory records does not exist, and is not implemented if the existing set of inventory records exists.

4. The system of claim 1, wherein the inventory compare system compares keys to determine if a file in the local file system has been modified.

5. A program product stored on a non-transitory computer readable medium for performing a virus scan on a local file system, the program product comprising:
program code configured for performing a full scan of each file in the local file system;
program code configured for inventorying each file in the local file system and generating a set of current inventory records, wherein each inventory record includes a unique key of the associated file, a complete filename of the associated file, and a signature of the associated file, wherein the unique key includes a hash code of the complete filename of the associated file, and the signature includes a timestamp of a last modification of the associated file and a size of the associated file;
program code for interfacing with a server to store and retrieve an existing set of inventory records stored on the server;
program code configured for comparing the current set of inventory records with the existing set of inventory records to identify files in the local file system that were modified since the existing set of inventory records was generated, wherein a file is identified as modified if the signature for the file in the current set of inventory records does not match the signature for the file in the existing set of inventory records such that at least a size of the file in the current set of inventory records is different from a size of the file in the existing set of inventory records; and
program code configured for selectively scanning only files in the file system that were identified as modified;
wherein, in the case that a record of the current set of inventory records included at the local file system and is not included in the existing set of inventory records on the server, the program code configured for selectively scanning scans the file associated with the record not included in the existing set of inventory records and located at the local file system, and the program code for interfacing with the server submits a request to the server to update the existing set of inventory records stored on the server to indicate that the selective scanning of the file associated with the record not included in the existing set of inventory records and located at the local file system has occurred.

6. The program product of claim 5, further comprising program code for forcing a full scan.

7. The program product of claim 5, wherein a full scan is run if the existing set of inventory records does not exist, and is not run if the existing set of inventory records exists.

8. The program product of claim 5, wherein the program code configured for comparing compares keys to determine if a file in the local file system has been modified.

9. A method of performing a virus scan on a local file system, comprising:
inventorying, using at least one computing device, each file in the local file system and generating, using the at least one computing device, a current set of inventory records, wherein each current inventory record includes a unique key of the associated file, a complete filename of the associated file, and a signature of the associated file, wherein the unique key includes a hash code of the complete filename of the associated file, and a signature includes a timestamp of a last modification of the associated file and a size of the associated file;
interfacing, using the at least one computing device, with a server to store and retrieve an existing set of inventory records stored on the server;
if the existing set of inventory records is located, comparing, using the at least one computing device, the current set of inventory records with the existing set of inventory records to identify files in the local file system that were modified since the existing set of inventory records were generated, and selectively scanning, using the at least one computing device, only files in the local file system that were identified as modified, wherein a file is identified as modified if the signature for the file in the current set of inventory records does not match the signature for the file in the existing set of inventory records such that at least a size of the file in the current set of inventory records is different from a size of the file in the existing set of inventory records; and if the existing set of inventory records is not located, performing, using the at least one computing device, a full scan of each file in the file system;

wherein, in the case that a record of the current set of inventory records included at the local file system and is not included in the existing set of inventory records on the server, scanning, using the at least one computing device, the file associated with the record not included in the existing set of inventory records and located at the local file system, and submitting, using the at least one computing device, a request to the server to update the existing set of inventory records stored on the server to indicate that the selective scanning of the file associated with the record not included in the existing set of inventory records and located at the local file system has occurred.

10. The method of claim 9, wherein the comparing step compares, using the at least one computing device, keys to determine if a file has been modified.

11. The method of claim 9, further comprising the step of forcing, using the at least one computing device, a full scan from a network server.

12. The method of claim 9, further comprising the step of updating, using the at least one computing device, the existing set of inventory records at the server with the current set of inventory records after a scan is completed.

13. A method for deploying an application that scans a local file system for viruses, comprising:
   providing a computer infrastructure being operable to:
      perform a full scan of each file in a local file system;
      inventory each file in the local file system and generating a set of current inventory records, wherein each current inventory record includes a unique key of the associated file, a complete filename of the associated file, and a signature of the associated file, wherein the unique key includes a hash code of the complete filename of the associated file, and the signature includes a timestamp of a last modification of the associated file and a size of the associated file;
      interface with a server to store and retrieve an existing set of inventory records stored on the server;
      compare the current set of inventory records with the existing set of inventory records to identify files in the local file system that were modified since the existing set of inventory records was generated, wherein a file is identified as modified if the signature for the file in the current set of inventory records does not match the signature for the file in the existing set of inventory records such that at least a size of the file in the current set of inventory records is different from a size of the file in the existing set of inventory records; and
      selectively scan only files in the local file system that were identified as modified;
   wherein, in the case that a record of the current set of inventory records is included at the local file system and not included in the existing set of inventory records on the server, scanning the file associated with the record not included in the existing set of inventory records and located at the local file system, and submitting a request to the server to update the existing set of inventory records stored on the server to indicate that the selective scanning of the file associated with the record not included in the existing set of inventory records and located at the local file system has occurred.

14. The method of deploying of claim 13, wherein the comparing includes compares keys to determine if a file in the local file system has been modified.

* * * * *